United States Patent [19]

Lecuyer et al.

[11] Patent Number: 5,811,067
[45] Date of Patent: Sep. 22, 1998

[54] CATALYTIC METHOD FOR SELECTIVELY REDUCING NITROGEN OXIDES

[75] Inventors: Christine Lecuyer, Levallois Perret; Ahmed Fakche, Villefontaine; Edouard Garbowski, Villeurbanne; Bernard Pommier, Caluire; Michel Primet, Rillieux la Pape, all of France

[73] Assignee: Gaz de France, Paris, France

[21] Appl. No.: 815,038

[22] Filed: Mar. 14, 1997

Related U.S. Application Data

[63] Continuation-in-part of Ser. No. 387,899, filed as PCT/FR94/00792, Jun. 29, 1994, abandoned.

[30] Foreign Application Priority Data

Jun. 30, 1993 [FR] France ..................... 93 08006

[51] Int. Cl.⁶ .............. B01D 53/56; B01J 37/08
[52] U.S. Cl. ................ 423/239.2; 423/213.5; 423/437.2; 502/85
[58] Field of Search ............ 423/239.2, 437.2, 423/213.5; 502/85, 74

[56] References Cited

U.S. PATENT DOCUMENTS

| | | | |
|---|---|---|---|
| 4,176,050 | 11/1979 | Chen et al. | 208/111 |
| 4,232,181 | 11/1980 | Kiovsky et al. | 585/739 |
| 4,923,835 | 5/1990 | Travers et al. | 502/66 |
| 4,952,543 | 8/1990 | Huang et al. | 502/35 |
| 5,164,351 | 11/1992 | Steinbach et al. | 502/74 |
| 5,171,553 | 12/1992 | Li et al. | 423/239 |
| 5,215,950 | 6/1993 | Bournonville et al. | 502/66 |
| 5,330,732 | 7/1994 | Ishibashi et al. | 423/213.2 |
| 5,407,651 | 4/1995 | Kawai | 423/213.2 |
| 5,407,880 | 4/1995 | Ikeda et al. | 502/67 |

FOREIGN PATENT DOCUMENTS

| | | |
|---|---|---|
| 0 011 926 A1 | 6/1980 | European Pat. Off. . |
| 0 040 914 A1 | 12/1981 | European Pat. Off. . |
| 0 303 527 A1 | 2/1989 | European Pat. Off. . |
| 0 306 170 A1 | 3/1989 | European Pat. Off. . |
| 0 400 591 A2 | 12/1990 | European Pat. Off. . |
| 0 499 286 A2 | 8/1992 | European Pat. Off. . |
| 0 541 008 A1 | 5/1993 | European Pat. Off. . |
| 1-135541 A | 5/1989 | Japan . |
| 4-267950 A | 9/1992 | Japan . |
| 4-363144 A | 12/1992 | Japan . |
| 5-76770 | 3/1993 | Japan . |
| 6-63410 A | 3/1994 | Japan . |
| 6-254352 A | 9/1994 | Japan . |
| 2 099 716 | 12/1982 | United Kingdom . |

Primary Examiner—Gary P. Straub
Assistant Examiner—Timothy C. Vanoy
Attorney, Agent, or Firm—Pennie & Edmonds LLP

[57] ABSTRACT

A method for the catalytic removal of nitrogen oxides, methane and carbon monoxide out of oxygen-rich exhaust gases emitted from motors that may combust natural gas by contacting the exhaust gas with a zeolite of the NFI structure that contains palladium. The palladium containing zeolite has been activated under oxygen prior to use by calcining the palladium containing zeolite at about 300° C. for about one hour, then calcining the palladium containing zeolite at about 500° C. for about one hour, and cooling the palladium containing zeolite to about 300° C.

13 Claims, 1 Drawing Sheet

CATALYTIC METHOD FOR SELECTIVELY REDUCING NITROGEN OXIDES

CROSS-REFERENCE TO RELATED APPLICATIONS

This application is a continuation-in-part of U. S. application Ser. No. 08-387,899 filed Feb. 17, 1995, now abandoned, which was a national stage filing under 37 C.F.R. 371 of PCT/FR94/00792 filed Jun. 29, 1994.

TECHNICAL FIELD

The invention concerns a process for the selective reduction of $NO_x$ and more particularly of NO and $NO_2$ a process of reduction of these $NO_x$ compounds to nitrogen.

One knows numerous processes of transformation of the $NO_x$ in nitrogen.

BACKGROUND ART

One of these processes consists in using, as a reducing agent, carbon monoxide or hydrogen and as a catalyst, a catalyst based on precious metals supported on alumina or silica.

But in an oxidizing atmosphere, the oxidation of the hydrogen and carbon monoxide by gaseous oxygen precedes the reduction of NO by hydrogen and this reaction of reduction will therefore only take place when all the oxygen has been consumed.

This means that in the presence of a high excess of oxygen, it is necessary to use processes of selective reduction. A most common process consists in using ammonia as a reducing agent for the $NO_X$ in the presence of a catalyst constituted of $V_2O_5$ and $WO_3$ deposited on $TiO_2$. This catalyst and this process enable one to accomplish the reduction of the $NO_X$ into nitrogen even in the presence of sulphur poisons.

But the catalytic materials have a limited lifetime and the installation requires an important investment. Furthermore the storage of ammonia as well as its use are difficult.

IWAMOTO et al., propose in Catal. Today, 10, (1991), 57, to replace ammonia by hydrocarbons. Thus selective reducing hydrocarbons would be the hydrocarbons having more than two carbons and particularly propane and propene. The catalysts used are zeolites with a high Si/Al atomic ratio exchanged or not with transition metals.

S. SUBRAMANIAN et al. in Ind Eng. Chem. Res., 31, (1992), 2460, studied the selective reduction of $NO_x$ by methane in the presence of a catalyst constituted of palladium supported on alumina and conclude that the simultaneous elimination of methane and NO cannot take place with this type of catalyst.

However, in the European patent application No. EP 0,499,286 A2, Y. KAWAI discloses catalysts constituted of Co-Ag and of Co-Pd on zeolite which would enable one to eliminate simultaneously carbon monoxide, NO and methane even in the presence of 5% of oxygen and at 500° C. In the same conditions a catalyst constituted of palladium supported on a zeolite of the MFI structure would not convert NO.

LI and ARMOR in the U.S. Pat. No. 5,149,512 use a catalyst constituted of a zeolite, particularly of the MFI structure, exchanged with Co for the selective reduction of $NO_x$.

But cobalt is not usable in industrial processes and in catalytic exhausts of automobile vehicles because it can transform itself in carbonyl cobalt complexes highly toxic and polluting for the environment.

Another disadvantage of the catalysts of the prior art disclosed in particular by LI, BATTAVIO and ARMOR in "Effect of Water Vapor on the Selective Reduction of NO by methane over Cobalt-Exchanged ZSM-5" Journal of catalysis 142,561–571, (1993), is their loss of activity in the presence of water.

SUMMARY OF THE INVENTION

In order to alleviate the above disadvantages and in contrast with this state of the technique, the present invention proposes a catalyst of reduction of $NO_x$ by methane or any mixture containing mainly methane such as for example natural gas, in an oxidizing atmosphere, constituted of a zeolite of the MFI structure exchanged with palladium the weight of which is comprised between 0.3% and 2% of the total weight of catalyst.

According to a characteristic of the catalyst of the invention, the weight content of palladium is about 0.5%

According to another characteristic of the invention, the catalyst is obtained from palladium II tetramine hydroxide as a precursor of Pd.

According to yet another characteristic of the invention the catalyst is activated in oxygen, before utilization by a process comprising the steps of: (a) raising the temperature from room temperature up to 300° C. with a rate of elevation in temperature of 0.5° C./mn, (b) plateau of 300° C. during an hour, (c) elevation in temperature from 300° C. up to 500° C. with a rate of elevation in temperature of 0.5° C./mn, (d) maintaining at 500° C. during an hour, and (e) cooling from 500° C. down to 300° C.

According to still another characteristic of the catalyst of the invention, after the precited step (e) a step (f) of time on stream with an inert gas such as helium is realized.

According to a further characteristic of the catalyst of the invention, the used zeolite of the MFI structure has an Si/Al atomic ratio of between 10 and 25.

The catalyst of the invention enables the reduction of the $NO_x$ to be accomplished in the presence of up to 10% by volume of $H_2O$ in the form of vapor and/or of up to 10% by volume of $O_2$ and/or of up to 0.8% by volume of CO.

According to a particularity of the invention, the selective reduction of $No_x$ is carried out at a temperature comprised between about 350° C. and 400° C.

The invention has also for object to propose a process of reduction of $NO_x$, in a oxidizing atmosphere, by methane or any mixture containing mainly methane such as for example natural gas, which comprises a step of reacting a reaction medium comprising among others methane, oxygen and $NO_x$ with a catalyst constituted of a zeolite of the MFI structure exchanged with between 0.3% and 2% by weight of palladium, with respect to the total weight of catalyst used, this process enabling the selective reduction of $NO_x$ to $N_2$. According to a particularity of the process of the invention, the zeolite of the MFI structure is exchanged with about 0.5% by weight of palladium with respect to the total weight of catalyst used.

According to another particularity of the process of the invention, the precursor of Pd is the palladium II tetramine hydroxide.

According to yet another particularity of the process of the invention, the catalyst is activated, before utilization, in oxygen, by a process comprising the steps of (a) elevation in temperature from room temperature up to 300° C. with a rate of elevation in temperature of 0.5° C./mn, (b) plateau of 300° C. during 1 hour, (c) elevation in temperature from 300° C. up to 500° C. with a rate of elevation in temperature of 0.5° C./mn, (d) maintaining at 500° C. during one hour, and (e) cooling from 500° C. to 300° C. in oxygen.

Still according to a particularity of the process of the invention, after the above step (e) a step (f) of time on stream with an inert gas such as helium is realized.

According to a characteristic of the process of the invention, the reaction medium can contain up to 0.8% by volume of CO which is then simultaneously oxidized.

According to another characteristic of the process of the invention, the said reaction medium can contain up to 10% by volume of $H_2O$ in vapor form.

According to yet another characteristic of the process of the invention, the said reaction medium can contain up to 10% by volume of O2.

According to a last characteristic of the process of the invention, the said step of reacting is carried out at a temperature comprised between about 350° C. and about 500° C.

BRIEF DESCRIPTION OF THE DRAWINGS

Other details, characteristics and advantages of the invention will appear better in the course of the detailed description that will follow and that is done in reference to the appended figures wherein.

DETAILED DESCRIPTION OF THE PREFERRED EMBODIMENT

Figure 1:
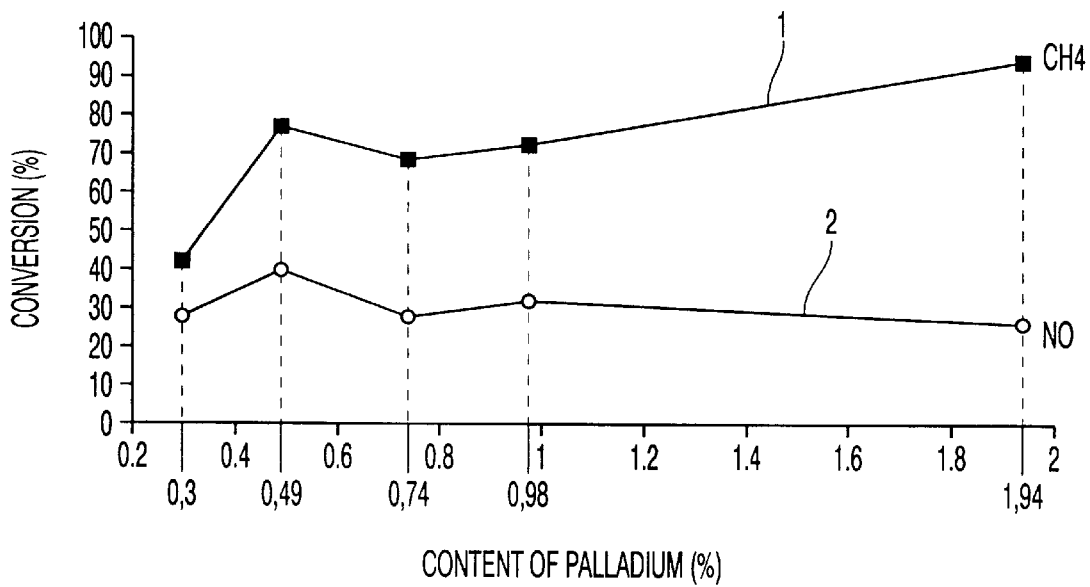
FIG. 1 illustrates the influence of the content of exchanged Pd in a zeolite of the MFI structure, on the percentage of $CH_4$ and of NO converted into $N_2$ or ($N_2O+N_2$).

The zeolite of the MFI structure, prepared according to a known process presents a Si/Al atomic ratio very variable that can attain extreme values (1000). This carrier has then served for the preparation of catalysts based on ions of metals of transition by cationic exchange between the ions of zeolite ($H^+$, $Na^+$, $Ca^{2+}$, ...) and those of transition metals. This exchange enables one to obtain metallic ions dispersed and stabilized within the zeolitic network.

The zeolites exchanged with precious metals according to the invention were prepared by cationic exchange using adequate precursors. The palladium (II) tetramine hydroxide is a particularly preferred precursor.

The following procedure was followed:

5 g of zeolite are filled in a beaker, then the precursor is added after having been diluted in 50 cm³ of distilled water. Agitation is maintained during an hour at a temperature of 25° C. to obtain the equilibrium of exchange. The solid is then filtered and washed with an abundant quantity of distilled water (about 1 liter). It is then dried in the oven at 120° C. overnight.

This preparation process enables one to obtain a catalyst based on palladium exchanged in the MFI zeolite which is interesting in that it has $Pd^{2+}$ ions, in low quantities indeed, but well dispersed from each others which twicely limits the possibilities of clustering.

The catalytic tests were carried out in a fixed bed reactor having the form of a U-tube without sinter wherein one places a little pad in wool of quartz on which is deposited 200 mg of catalyst.

The catalyst is then activated in situ in oxygen by slowly raising temperature (0.5° C./mn) from 25° C. up to 300° C. followed by a plateau of 300° C. during 1 hour before being brought to a temperature of 500° C. with a rate of elevation between 300° C. and 500° C. of 0.5° C./mn. The temperature is then maintained at 500° C. during 1 hour before cooling down to 300° C. in oxygen. One then sweeps the catalyst during 30 minutes with helium before injecting the reaction mixture comprising gases such as methane, $NO_x$, carbon monoxide, oxygen and water in the form of vapor.

The exhaust gases are analysed with two chromatographs or infrared analyzers depending on the nature of the gas to analyse. The first chromatograph is a chromatograph with a catharometric detection (T.C.D.), INTERSMAT IGC 121 ML. The chromatographic column of separation is a CTR column of a length of 2 meters, a diameter of ¼ of an inch of stainless steel containing a molecular sieve 5A and PORAPAK Q. The carrier gas is helium. The oven, the injector and the detector are at a temperature of 40° C. The sensitivity of the detector is 250 mA.

The second chromatograph is a chromatograph with a flame ionization detector (F.I.D.) INTERSMAT IGC 120 FB. The column has a length of 2 meters and a diameter of ⅛ of an inch and contains PORAPAK Q.

The carrier gas is helium. The oven temperature is 130° C. The temperature of the injection is 175° C. and that of the detector is 170° C.

The Si, Al, Pd contents have been analysed by atomic absorption and the Si/Al atomic ratios of the obtained zeolites are given as atomic ratios.

EXAMPLES

The invention is based on the surprising discovery that, contrarily to the teachings of the prior art a catalyst constituted of a zeolite of the MFI structure exchanged with between 0.3% and 2% by weight of palladium with respect to the total weight of catalyst presents numerous proprieties that will be described in relation with the examples that will follow.

In these examples, it is the reduction of NO rather than that of $NO_2$ that has been studied because it is admitted by the man skilled in the art that NO is representative of the $NO_x$.

Space velocities of 35000 $h^{-1}$ were used for the realization of the tests carried out in the Examples 1 to 35 and 39 to 43.

Examples 1 to 5.

Various catalysts constituted of MFI zeolite with a Si/Al atomic ratio=15 exchanged with different amounts of Pd were synthesized as previously described and tested at 500° C. with a reaction mixture comprising 2% volume of oxygen, 0.1% volume of methane and 0.2% volume of NO.

The conversions and selectivities corresponding to the initial activity of the catalyst are shown in the Table 1.

TABLE 1

| Example N° | Content of Pd in wt % | Conversion of $CH_4$ in % | Conversion of NO in % | Selectivity in $N_2O$ in % | Selectivity in $N_2$ in % |
|---|---|---|---|---|---|
| 1 | 0.3 | 42 | 28 | 0 | 100 |
| 2 | 0.49 | 78 | 40 | 0 | 100 |
| 3 | 0.74 | 69 | 28 | 7 | 93 |

TABLE 1-continued

| Example N° | Content of Pd in wt % | Conversion of $CH_4$ in % | Conversion of NO in % | Selectivity in $N_2O$ in % | Selectivity in $N_2$ in % |
|---|---|---|---|---|---|
| 4 | 0.98 | 73 | 32 | 0 | 100 |
| 5 | 1.94 | 96 | 27 | 8 | 92 |

These results have also been represented in the form of curves 1 and 2 in the appended FIG. 1.

FIG. 1 shows the conversion of methane (curve 1) and of NO (curve 2) versus the Pd content (weight %) of the catalyst.

It is then noticed that the conversions of NO and of $CH_4$ are simultaneously high for palladium contents comprised between about 0.4% and about 0.6% by total weight of catalyst, the maximum of activity being obtained for a palladium content of 0.5% by weight with respect to the total weight of the catalyst.

Furthermore, the selectivity in $N_2$ is excellent with this catalyst. Thus the formation of undesirable $N_2O$, is close to zero.

Examples 2 and 6 to 10.

Catalysts constituted of a zeolite of the MFI structure with a Si/Al atomic ratio of 15 exchanged with about 0.49% by weight of palladium for the examples 2 and 6 to 8 and with about 0.97% by weight of palladium for the examples 9 and 10 were tested at 500° C. with a reaction mixture containing between 0.2% and 10% by volume Of $O_2$, 0.1% by volume of $CH_4$ and 0.2% by volume of NO.

The conversions and selectivities corresponding to the initial activity of the catalyst are shown in the following Table 2.

TABLE 2

| Example N° | Concentration of $O_2$ in % | Conversion of $CH_4$ in % | Conversion of NO in % | Selectivity in $N_2O$ in % | Selectivity in $N_2$ in % |
|---|---|---|---|---|---|
| 6 | 0.2 | 62 | 37 | 0 | 100 |
| 7 | 0.4 | 72 | 40 | 0 | 100 |
| 8 | 0.8 | 78 | 40 | 0 | 100 |
| 2 | 2 | 78 | 40 | 0 | 100 |
| 9 | 0.2 | 39 | 23 | 5 | 95 |
| 10 | 10 | 98 | 26 | 25 | 75 |

It can be seen from these examples that the excellent capability of converting NO of the catalysts of the invention hardly depends on the content in oxygen in the range of 0.2% to 10% $O_2$ by volume.

Examples 2 and 11.

The reactants and conditions of reactions are similar to those in examples 2 and 6 to 8, but the oxygen concentration is set to 2% in volume and the conversions and selectivities correspond to the initial activity of the catalyst then at the activity of said catalyst after 15 h of time on stream (and therefore of reaction).

The results are shown in the following Table 3.

TABLE 3

| Example N° | Time on stream | Conversion of $CH_4$ in % | Conversion of NO in % | Selectivity in $N_2O$ in % | Selectivity in $N_2$ in % |
|---|---|---|---|---|---|
| 2 | 0 | 78 | 40 | 0 | 100 |
| 11 | 15 | 78 | 40 | 0 | 100 |

These results mean that the catalyst of the invention is stable with time.

Examples 11 to 13.

The reactants and conditions of reaction are similar to those of the examples 2 and 11. The stability of the catalyst after 15 hours on stream having been established in the previous examples, 0.8% by volume of CO was added to the reaction mixture after 15 hours.

The results of these tests are shown in the following Table 4.

TABLE 4

| Example N° | Time in hours | Concentration in CO in % | Conversion of $CH_4$ in % | Conversion of NO in % | Selectivity in $N_2O$ in % | Selectivity in $N_2$ in % |
|---|---|---|---|---|---|---|
| 11 | 15 | 0 | 78 | 40 | 0 | 100 |
| 12 | 16 | 0.8 | 75 | 40 | 0 | 100 |
| 13 | 20 | 0.8 | 78 | 40 | 0 | 100 |

As shown by the results shown in this Table, the addition to the reaction mixture of 0.8% of CO modifies neither the conversion of methane nor that of the NO. The carbon monoxide is totally converted to $CO_2$ at temperatures much lower to those needed for the reduction of NO by methane. This property is important because the gases originating from the combustion of methane may contain CO. CO may originate from the uncomplete oxidation of methane or from WGS (water-gas-shift):

$$CO_2 + H_2 \rightleftarrows CO + H_2O,$$

or also from the reforming of methane:

$$CH_4 + H_2O \rightleftarrows CO + 3H_2$$

In every case CO appears as an additional reducing agent present in the effluents. CO may then react with NO to produce $CO_2$ and $N_2$. This reaction competes with the reduction of NO by $CH_4$.

Thus one could have thought that the presence of CO in the reaction mixture should have decreased the methane conversion. In fact, it is not so as the catalyst of the invention is sufficiently active to maintain the $CH_4$ conversions even in the presence of 0.8% of CO. Furthermore the selectivity in $N_2$ is not modified.

Examples 14 to 17.

Tests were carried out with catalysts constituted of a zeolite of the MFI structure with a Si/Al atomic ratio of 19 exchanged with about 0.97% by weight of Pd and with a reaction mixture comprising 1.6% by volume of oxygen, 0.1% by volume of $CH_4$ and 0.2% by volume of NO and in which water was introduced in the form of vapor, in order to test the activity and the selectivity of this catalyst in the presence of water.

Indeed the methane combustion flue gas contains water vapor which is known to deteriorate the performances of this type of catalysts.

The results are shown in Table 5.

functioning with natural gas or equipped with a dual fuel system (gasoline/natural gas).

The reactants and conditions of reactions are similar to those in examples 2 and 6 to 8 but the content of palladium is set to 0.97%.

The volumetric composition of natural gas is the following :

$CH_4$ = 91.37%
$N_2$ = 0.70%
$C_2H_6$ = 6.70%
$C_3H_8$ = 1.10%
iso$C_4H_{10}$ = 0.04%
n$C_4H_{10}$ = 0.04%
neo$C_5H_{12}$ = 0.01%
iso$C_5H_{12}$ = 0.02%
n$C_5H_{12}$ = 0.02%

The conversions and selectivities corresponding to the initial activity of the catalyst are shown in the following Table 6.

TABLE 6

| Example N° | Concentration in $O_2$ in % | Conversion of $CH_4$ in % | Conversion of hydrocarbons other than $CH_4$ in % | Conversion of NO in % | Selectivity in $N_2O$ in % | Selectivity in $N_2$ in % |
|---|---|---|---|---|---|---|
| 18 | 0.2 | 91 | 100 | 28 | 6 | 94 |
| 19 | 0.4 | 94 | 100 | 30 | 7 | 93 |
| 20 | 0.8 | 95 | 100 | 31 | 6 | 94 |
| 21 | 2 | 89 | 100 | 32 | 10 | 90 |

These results show that the activity of the catalyst of the invention is just as good, even when using natural gas.

Examples 22 to 24

Finally, experiments were carried out on catalysts identical to those in examples 14 to 17 in the presence of a mixture representative of exhaust gases originating from a combustion of gasoline (stoechiometric mixture) and at different temperatures of reaction.

TABLE 5

| Example N° | Time on stream in hours | Concentration of $H_2O$ in vol. % | Conversion of $CH_4$ in % | Conversion of NO in % | Selectivity in $N_2O$ in % | Selectivity in $N_2$ in % |
|---|---|---|---|---|---|---|
| 14 | 0 | 0 | 89 | 38 | 5 | 95 |
| 15 | 0 | 5.3 | 91 | 32 | 10 | 90 |
| 16 | 1 | 7.5 | 92 | 31 | 19 | 81 |
| 17 | 2 | 10 | 89 | 27 | 6 | 94 |

These results show that up to a content of water of about 10% in volume, the activity of the catalyst remains excellent. The conversion of methane is constant and that of NO moves from 38 to 27%.

Examples 18 to 21.

The catalyst was then tested with natural gas in presence of oxygen, in order to test the feasibility of this catalyst to the treatment of the exhaust gases of motors of vehicles Indeed in the context of an application to a vehicle equipped with a dual fuel system gasoline/natural gas, the exhaust catalyst must be able to treat exhaust gases issued from the combustion of these two fuels.

The reaction mixture then comprises 5025 ppm of CO, 685 ppm of No, 1060 ppm of $C_3H_6$ and 6940 ppm of $O_2$.

The results of these tests are shown in Table 7.

TABLE 7

| Example No | Temperature in °C. | Conversion of CO in % | Conversion of $C_3H_6$ in % | Conversion of NO in % | Selectivity in $N_2O$ in % | Selectivity in $N_2$ in % |
|---|---|---|---|---|---|---|
| 22 | 360 | 56 | 70 | 44 | 0 | 100 |
| 23 | 409 | 100 | 98 | 74 | 15 | 85 |
| 24 | 440 | 100 | 100 | 100 | 0 | 100 |

Therefore, the catalyst shows an excellent activity for exhaust gases originating from the combustion of natural gas and gasoline at temperatures comprised between about 350° C. and about 450° C.

Moreover, for comparison purposes, various catalysts have been tested:
catalysts constituted of a zeolite of the mordenite structure with large pores exchanged with different contents in Pd,
catalysts constituted of zeolite of the mordenite structure with large pores and MFI structure exchanged or impregnated with cobalt at varying concentrations.

Examples 25 to 29. (Comparative)

In these examples, the protonated zeolite with large pores is obtained by firing a commercial ammoniated mordenite of a composition corresponding to a Si/Al atomic ratio of 5.5.

This $NH_4M$ zeolite is fired to eliminate $NH_3$ and to obtain the protonated form of the mordenite.

This zeolite is then exchanged with palladium to different contents and tested at a temperature of 500° C. with a reaction mixture comprising 2% by volume of oxygen, 0.1% by volume of $CH_4$ and 0.2% by volume of NO.

The conversions and selectivities corresponding to the initial activity of the catalyst are shown in the following Table 8.

TABLE 8

| Example N° | Content of Pd in % | Conversion of $CH_4$ in % | Conversion of NO in % | Selectivity in $N_2O$ in % | Selectivity in $N_2$ in % |
|---|---|---|---|---|---|
| 25 | 0.52 | 67 | 18 | 0 | 100 |
| 26 | 0.7 | 98 | 27 | 0 | 100 |
| 27 | 0.87 | 100 | 24 | 0 | 100 |
| 28 | 0.95 | 91 | 16 | 4 | 96 |
| 29 | 1.26 | 100 | 19 | 0 | 100 |

Figure 2:
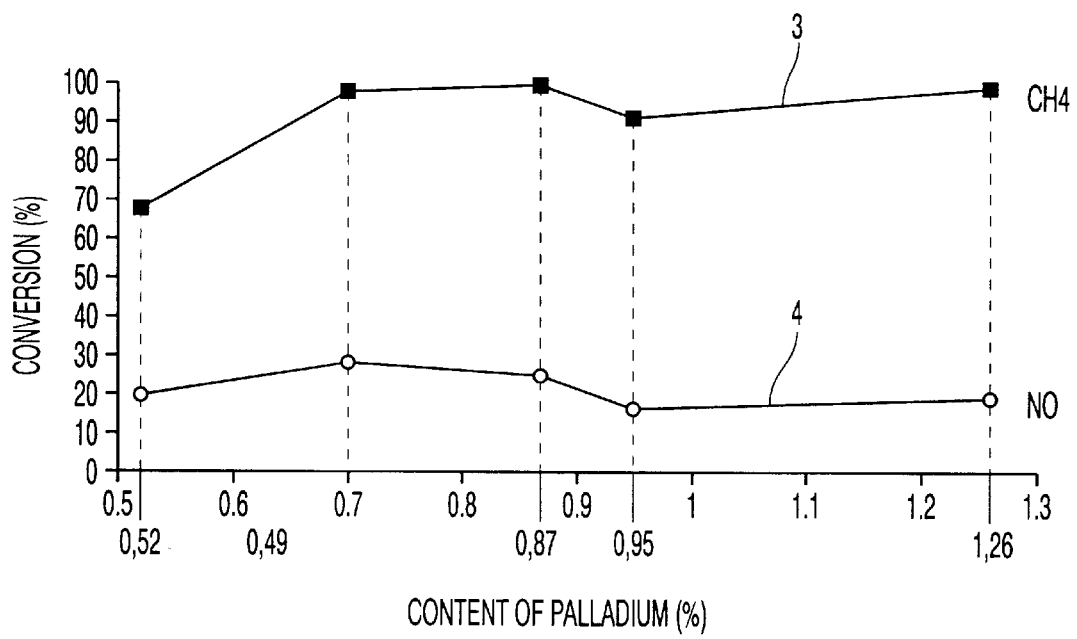
FIG. 2 illustrates the influence of the content of Pd exchanged in a zeolite of the protonated zeolite structure with large pores, on the percentage of $CH_4$ and of NO converted into $N_2$ or ($N_2O+N_2$)

Besides, these results have been reported in FIG. 2 which illustrates the influence of the content of Pd in a zeolite of the mordenite type with large pores on the activity of the catalyst, In this figure, one has plotted on the x-axis the percentage by weight with respect to the total weight of catalyst of Pd exchanged in a zeolite of the mordenite structure with large pores and on the y-axis the corresponding percentages of converted $CH_4$ (curve 3) and NO (curve 4).

On the whole range of contents of palladium studied, one can note that the activity of this catalyst in converting NO is lower than that of the catalysts of the invention.

Examples 30 to 35.

Experiments were also carried out on catalysts constituted of zeolite of the MFI structure exchanged or impregnated with cobalt.

The catalyst constituted of MFI zeolite exchanged with cobalt was prepared by exchanging the protons of the MFI zeolite with cobalt ions.

Other catalysts were prepared by impregnation of cobalt on a carrier of zeolite of the MFI structure and on a carrier of zeolite of the protonated mordenite structure with large pores according to the following procedure:

the precursor was cobalt nitrate dissolved in water that had been added to a known weight of zeolite. One left it under agitation during 1 hour then the water was removed by evaporation at 60° C. in an evaporator under reduced pressure. After drying overnight at 120° C., the solid was fired in oxygen at a slow raising temperature rate of 0.5° C. per minute followed by two successive plateaux of 300° C. during 1 hour and of 500° C. during 1hour.

These catalysts based on cobalt were tested at a temperature of 500° C. with a reaction mixture containing 2% by volume of oxygen, 0.1% by volume of methane and 0.2% by volume of NO.

The conversions and selectivities corresponding to an activity of the catalyst after variable times of time on stream (and consequently of reaction) are shown in the following Table 9.

TABLE 9

| Example N° | Catalyst | Time on stream in hours | Conversion of $CH_4$ in % | Conversion of NO in % | Selectivity in $N_2O$ in % | Selectivity in $N_2$ in % |
|---|---|---|---|---|---|---|
| 30 | 0.4% Co/MFI (e) | 0 | 26 | 5 | 0 | 100 |
| 31 | 0.4% Co/MFI (e) | 2 | 26 | 4 | 0 | 100 |
| 32 | 4.65% Co/HMLP* (i) | 0 | 86 | 33 | 0 | 100 |
| 33 | 4.65% Co/HMLP* (i) | 21 | 88 | 38 | 0 | 100 |
| 34 | 4.3% Co/MFI (i) | 0 | 80 | 7 | 0 | 100 |
| 35 | 4.3% Co/MFI (i) | 1 | 81 | 9 | 0 | 100 |

*: mordenite structure with large pores
(e): prepared by exchange
(i): prepared by impregnation These results show that only a catalyst constituted of a zeolite of the mordenite type with large pores impregnated with 4.65% by weight of cobalt with respect to the total weight of catalyst presents an activity comparable with that of the catalyst of the invention. However this type of catalyst can lead to the production of toxic complexes of cobalt carbonyl.

Examples 36 to 38.

The following tests were realized with a reaction mixture comprising 1000 ppm of $CH_4$, 2000 ppm of NO and 2% of $O_2$ on a catalyst of the invention, at a temperature of 500°C., in order to confirm the influence of the space velocity on the conversion of $CH_4$ and NO.

Indeed, the higher the space velocity, the lower the time of contact of the reaction medium with the catalyst, which leads normally to a decrease in the percentages of converted $CH_4$ and NO.

The conversions of $CH_4$ and NO obtained at different space velocities are shown in the following Table 10.

TABLE 10

| Example N° | Space velocity in $h^{-1}$ | Conversion of $CH_4$ in % | Conversion of NO in % |
|---|---|---|---|
| 36 | 35000 | 90 | 22 |
| 37 | 17500 | 98 | 29 |
| 38 | 8750 | 100 | 31 |

The Examples 36 to 38 show that a decrease in the space velocity of a factor 4 increases the conversion of NO of about 40% and the conversion of $CH_4$ of about 10%.

Examples 39 to 43.

The influence on the conversion of NO, of the quantity of reducer (methane) used has been studied.

A catalyst constituted of a zeolite of the MFI structure with a Si/Al atomic ratio=18, exchanged with 0.97% of Pd was tested in the presence of 2% of oxygen, at a temperature of 500° C. and a space velocity of 35000 $h^{-1}$. The concentration in NO was maintained constant at 2000 ppm.

The results are shown in the following Table 11.

TABLE 11

| Example N° | Concentration in $CH_4$ in ppm | Concentration in NO in ppm | Conversion of NO in % |
|---|---|---|---|
| 39 | 1000 | 2000 | 33 |
| 40 | 2000 | 2000 | 43 |
| 41 | 3000 | 2000 | 45 |
| 42 | 4000 | 2000 | 45 |
| 43 | 5000 | 2000 | 43 |

The results shown in Table 11 show an increase in the percentage of NO converted when the concentration in methane increases from 1000 ppm to 2000 ppm. After 2000 ppm and up to 5000 ppm of $CH_4$, the percentage of converted NO remains constant.

The catalyst according to the invention presents consequently the advantage of being able to be used in an oxidizing atmosphere, more particularly in an atmosphere containing up to 10% of oxygen, with methane or natural gas or gasoline, in the presence of up to 10% of water, and that in difficult conditions, that is with a low concentration in Pd, high space velocities and low concentrations in reducer. Further it does not lead to the production of toxic compounds, such as Co which is totally converted into $CO_2$, which would allow in particular a use as a catalyst in the catalytic exhausts of vehicles functioning with natural gas.

Of course, the invention is in no way limited to the embodiments described and illustrated which were given by way of examples only.

Thus, the catalyst according to the invention could be used in other operation conditions, for example, with different concentrations in NO, $CH_4$, whether in fixed or fluidized bed.

That is to say that the invention comprises all the technical equivalents of the means described as well as their combinations if they are carried out according to its spirit.

What is claimed is:

1. A process for the reduction of $NO_x$, which comprises contacting $NO_x$, with a reaction medium that contains methane and oxygen in the presence of a catalyst comprising a zeolite of MFI structure which has been ion exchanged with palladium by an amount of between about 0.3% and 2% by weight with respect to the total weight of catalyst, said contacting carried out for a sufficient time and at a sufficient temperature to selectively reduce $NO_x$ to $N_2$ and wherein said catalyst has been activated in oxygen before utilization by:

(a) heating the catalyst up to about 300° C. at a heating rate of about 0.5° C./minute;

(b) maintaining the catalyst at about 300° C. for about one hour;

(c) heating the catalyst up to about 500° C. at a heating rate of about 0.5° C./minute;

(d) maintaining the catalyst at about 500° C. for about one hour, and (e) cooling the catalyst to about 300° C.

2. The process according claim 1, wherein the zeolite of the MFI structure is ion exchanged with between about 0.4 to 0.6% by weight in palladium with respect to the total weight of catalyst.

3. The process according to claim 1, wherein the catalyst is obtained by cationic exchange with palladium II tetramine hydroxide as a palladium precursor.

4. The process according to claim 1, which further comprises sweeping the catalyst with an inert gas after the catalyst has been cooled to 300° C. during its activation.

5. The process according to claim 1, wherein the zeolite of the MFI structure has a Si/Al atomic ratio of about 10 to 25.

6. The process according to claim 5, wherein the selectivity of the conversion of the $NO_x$ to $N_2$ is between about 90 and 100%.

7. The process according to claim 5, wherein the conversion of methane is between about 62 and 96%.

8. The process according to claim 5, wherein the conversion of $NO_x$ is at least about 30%.

9. The process according to claim 1, wherein the reaction medium contains CO in an amount of up to about 0.08% by volume, and which further comprises simultaneously oxidizing the CO by contact with the catalyst.

10. The process according to claim 1, wherein the reaction medium contains water vapor in an amount of up to about 10% by volume.

11. The process according to claim 1, wherein the oxygen is present in the reaction medium in a maximum amount of about 10% by volume.

12. The process according to claim 1, wherein the reduction is conducted at a temperature of between about 350° C. and about 500° C.

13. The process according to claim 1, wherein methane is present in the form of natural gas.

* * * * *